United States Patent
Mäntyjärvi et al.

(10) Patent No.: US 6,956,506 B2
(45) Date of Patent: Oct. 18, 2005

(54) METHOD AND ARRANGEMENT FOR ENTERING DATA IN AN ELECTRONIC APPARATUS AND AN ELECTRONIC APPARATUS

(75) Inventors: Jani Mäntyjärvi, Espoo (FI); Jussi Koivumäki, Oulu (FI); Atte Kinnula, Kempele (FI)

(73) Assignee: Nokia Mobile Phones Ltd., Espoo (FI)

( * ) Notice: Subject to any disclaimer, the term of this patent is extended or adjusted under 35 U.S.C. 154(b) by 587 days.

(21) Appl. No.: 09/892,000

(22) Filed: Jun. 26, 2001

(65) Prior Publication Data

US 2002/0006807 A1 Jan. 17, 2002

(30) Foreign Application Priority Data

Jun. 28, 2000 (FI) .............................. 20001535

(51) Int. Cl.$^7$ ........................ H03K 17/94; H03M 11/00
(52) U.S. Cl. .......................... 341/22; 345/168; 400/489
(58) Field of Search ..................... 341/22, 26; 382/156, 382/161; 345/7, 8, 25, 168; 400/489

(56) References Cited

U.S. PATENT DOCUMENTS 6,388,657 B1 * 5/2002 Natoli ........................ 345/168

FOREIGN PATENT DOCUMENTS

FI          103305          5/1999

OTHER PUBLICATIONS

Finnish Patent Application Document No. FI 990676, English translation attached.

* cited by examiner

*Primary Examiner*—Timothy Edwards, Jr.
(74) *Attorney, Agent, or Firm*—Perman & Green, LLP.

(57) ABSTRACT

The invention relates to a method and arrangement for creating a virtual keyboard for a terminal (800) used in a cellular network. The virtual keyboard is generated using an IR transceiver arrangement (12) in which a reflection from an obstacle (15) placed in the field of IR transmitters is registered by discrete IR receivers. The received reflection data are processed in a neural network arrangement (33). The purpose of the data processing is to find out the virtual key position/function that the received reflection data corresponds to.

24 Claims, 6 Drawing Sheets

METHOD AND ARRANGEMENT FOR ENTERING DATA IN AN ELECTRONIC APPARATUS AND AN ELECTRONIC APPARATUS

The invention relates to a method for entering, by means of a virtual keyboard, data in an electronic apparatus housed within a body, which method comprises the steps of emitting infrared radiation by at least one infrared transmitter in at least one plane, placing an obstacle in the radiation field of the infrared transmitter, receiving infrared radiation reflected from the obstacle by at least one infrared receiver in at least one plane, preprocessing the received reflected signal, and determining the position of the obstacle on the basis of the received preprocessed signal. The invention further relates to an input arrangement of an electronic apparatus for realizing the operation of the above-mentioned virtual keyboard, and to a recognition program belonging to the input arrangement.

Various wireless devices, such as cellular phones and palmtop computers, need some kind of a physical user interface for data and command input. For example, it is known a small mobile phone keyboard with keys 1–9, *, 0 and #, in addition to other possible letter characters produced by these keys. Likewise, it is known a so-called "communicator" keyboard of a cellular phone used in cellular networks with alphanumeric keys a-z and 1–0. These keyboards are made as small as possible so that they are relatively difficult to use in comparison with keyboards of normal computers.

Touch keyboards of various sizes for electric devices are also known. Such keyboards are usually arranged in the form of a touchscreen on the device's display. In such an arrangement, arrays of LED transmitters and receivers, for example, are placed in the frame around the screen, on more than one side of the screen. When a finger or some other obstacle is pointed at a position on the screen, a ray of infrared light is cut off, resulting in some predetermined action.

Patent application FI 990676 further discloses a method in which there is generated, by means of a plurality of infrared transceiver units, an artificial, virtual, two-dimensional keyboard arrangement on one side of an apparatus. In the close vicinity of the apparatus there is thus created a data input area, a kind of a two-dimensional virtual keyboard in the X-Y plane. According to the said application, an image of the virtual keyboard can be advantageously projected on an even surface by means of a laser diode and refractive optics. The said surface on which the virtual keyboard is generated is usually the surface of a table. The exact position of an obstacle/pointer or finger on the plane determined by the virtual keyboard is detected by means of infrared transmitters and receivers. The exact position on the virtual keyboard detected by the device disclosed corresponds to the execution of a certain function or to the pressing of a key on a real keyboard.

Figure 1:
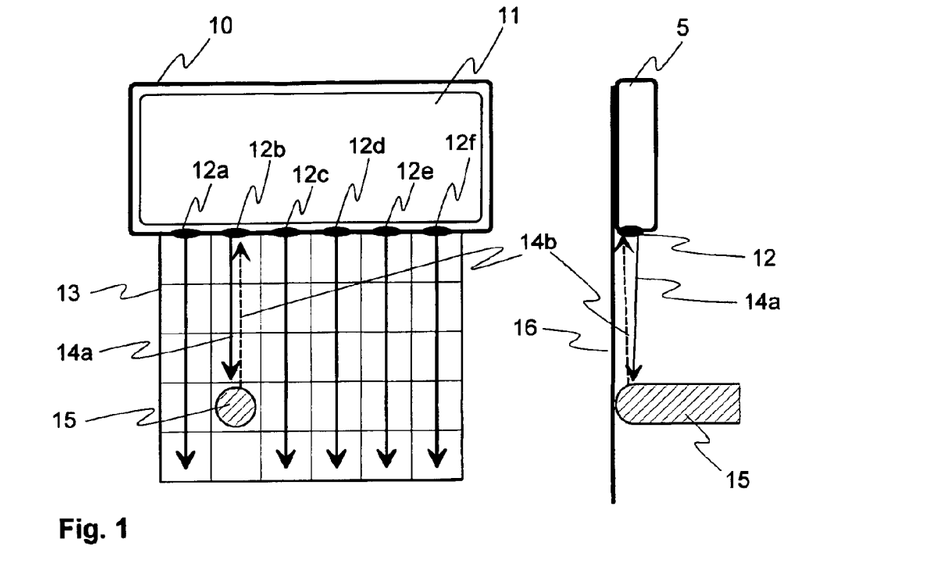
FIG. 1 shows top and side views of a virtual keyboard according to the prior art.

FIG. 1 shows in top and lateral views the fundamental construction of the device mentioned above. The virtual keyboard arrangement comprises an apparatus 10 which includes a display 11 and a virtual keyboard 13. The apparatus 10 is placed on the surface of a table 16, for example. The apparatus and its virtual keyboard 13 are activated. The virtual keyboard 13 comprising a text grid is projected from the apparatus 10 onto the surface 16 by means of light sources and suitable optics. It is also possible to use a planar plate or board on the surface of which the key positions are marked. The apparatus 10 disclosed in the above-mentioned document comprises in the example depicted in FIG. 1 six infrared transceivers 12a to 12f. In this arrangement each vertical column of the keyboard has a transceiver unit of its own. For each column a narrow infrared light beam 14a is emitted. The light beam 14a emitted is reflected from an obstacle 15, say a finger or a pointer like a pen, back into the apparatus 10. The reflected light beam 14b is received by one or more receivers 12a to 12f in the apparatus 10.

In the example of FIG. 1 the virtual keyboard is drawn to consist of bright horizontal and vertical lines as well as letters, numbers and possible special characters such as "+" and "−". The lines represent the borders between the individual keys. The optical technology for projecting the virtual keyboard is well known. Using digital signal processing (DSP) techniques it can be calculated from the intensity or angle of incidence of the scattered infrared light or from the phase angle of the signal, the position of the obstacle 15 on the surface 16 in the same X-Y plane as the bottom plane of the apparatus. The problem with this arrangement is, however, that the received signal has a very nonlinear nature because it is reflected from an irregular-shaped obstacle. In addition, randomly varying infrared radiation is received from the surroundings, adding to the noisiness of the received signal. Therefore, the amplitude and phase characteristics of the signal reflected/returned back to the receiver vary a great deal not just on the basis of the position of the obstacle. Thus, various tabulated correction coefficients, which have been obtained by experimentation, have to be used to calculate the position of the obstacle. Therefore, the computational processing of the received signal is difficult and requires large computing capacity in order to calculate the position of the obstacle at the desired accuracy from the received signal. In this case problems will be caused by the computing capacity of the processor and the size of the memory needed in the calculation in a cellular phone, for example. Moreover, if the position of the obstacle is to be determined in a third dimension as well (X, Y, and Z dimensions), the calculation will require very much computing capacity and memory, and to realize such a solution by conventional DSP techniques in a small handheld device is difficult.

An object of this invention is to provide a new kind of decision-making procedure and arrangement for a virtual keyboard arrangement, which requires less computing capacity and memory than an arrangement implemented using DSP solutions according to the prior art. Another object of this invention is to make possible the creation of a three-dimensional artificial keyboard/user interface. The method and arrangement can be advantageously applied in future third-generation cellular terminals.

The objects of the invention are achieved by an arrangement realizing a virtual two- or three-dimensional keyboard arrangement/user interface functioning in the infrared region. The nonlinear and multidimensional signal obtained from this virtual keyboard is processed using an arrangement based on a pattern recognition method, such as e.g. a neural network technique efficient at processing nonlinear signals.

The method for recognizing the position of an obstacle in a virtual keyboard is characterized in that to determine the position of the obstacle in at least one plane, a neural network arrangement is used into which a preprocessed signal is conducted to determine the position.

The input arrangement of a virtual keyboard according to the invention is characterized in that the input arrangement comprises a pattern-recognizing neural network element stored in the memory of the apparatus to recognize the use of a given key in the virtual keyboard.

The program realizing the recognition of the operation of the virtual keyboard is characterized in that the program comprises a step of receiving input signals in at least one neuron of a hidden layer of a neural network, a step of weighting input signals by suitable weighting coefficients in each hidden-layer neuron, a step of adding up the weighted input signals in each hidden-layer neuron in order to produce an output signal, a step of processing the output signal in the activation element of each hidden-layer neuron in order to produce a result signal, a step of processing the result signals of the hidden-layer neurons in the output cells of the neural network, and a step of implementing the results of the inference routines of the neural network element.

Some advantageous embodiments of the invention are specified in the dependent claims.

The basic idea of the invention is as follows: A virtual keyboard is generated by means of an infrared transmitter-receiver arrangement beside an electronic apparatus which advantageously is a cellular terminal. An obstacle, i.e. pointer, finger or the like, is placed in the infrared field thus generated, reflecting back infrared light emitted. The reflected infrared light is received by one or more infrared receivers. The peak value of every received signal is then determined, whereafter the signals are AD-converted, after which each received signal is low-pass filtered by a digital filter associated with it, and finally the filtered signals are conducted to a pattern recognition process which is advantageously a neural network arrangement. On the basis of the input signals (the filtered infrared receiver signals) the pattern recognition arrangement decides which key on the virtual keyboard the obstacle points at.

An advantage of the invention is that in spite of the nonlinearities in the received signals the neural network arrangement used in the pattern recognition makes with high probability a correct decision compared with decisions made using DSP methods according to the prior art.

Another advantage of the invention is that the terminal's computing power and size of memory required by the neural network arrangement used in the pattern recognition are small compared with DSP methods according to the prior art.

A further advantage of the invention is that the method is not limited to two dimensions only but it can be supplemented with a positioning function in a third dimension.

The invention is described in detail in the following. The description refers to the accompanying drawings in which.

FIG. 1 was discussed in conjunction with the description of the prior art.

Figure 2A:
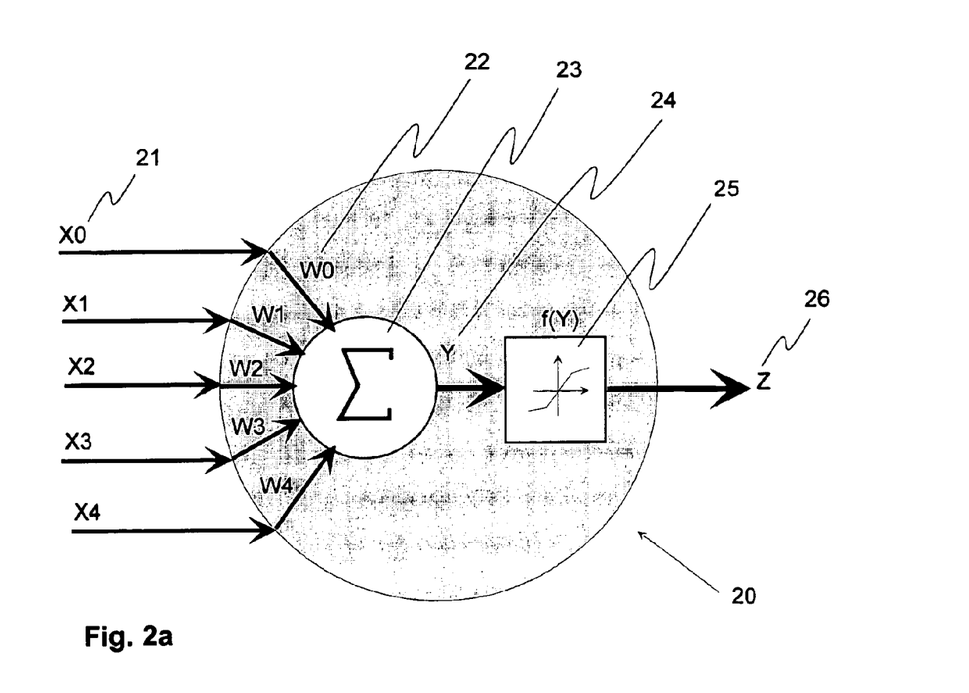
FIG. 2a shows by way of example a cell in a neural network.

FIG. 2a shows by way of example the principal components of a neural network cell 20, hereinafter called a neuron, in a neural network arrangement used in pattern recognition. Data is input to an individual neuron via input lines. In the exemplary situation depicted in FIG. 2a, the values of five input signals (X0, X1, X2, X3, X4) 21 are input to the neuron. Each of the individual values of the input signal 21 is weighted by a weighting coefficient (W0, W1, W2, W3, W4) 22 corresponding to the input signal, and the input signal values thus weighted are added up in a summing element 23 associated with the neuron. The output signal Y, reference numeral 24, from the summing element 23 is conducted to the input of an activation element 25 in the neuron. The connection between the input and output of the activation element is determined by a function f(Y). This function f(Y) is determined/selected case by case and it may be either linear or nonlinear. The value of the result signal Z, reference numeral 29, at the output of the activation element depends of course on the signals 21 input to the neuron, the weighting coefficients 22 applied, and on the activation function 25 used. Training a neuron for a given operating model means that the weighting coefficients 22 and activation function 25 are defined in the neuron in such a manner that a known input signal 21 produces a desired result signal 29.

Figure 2B:
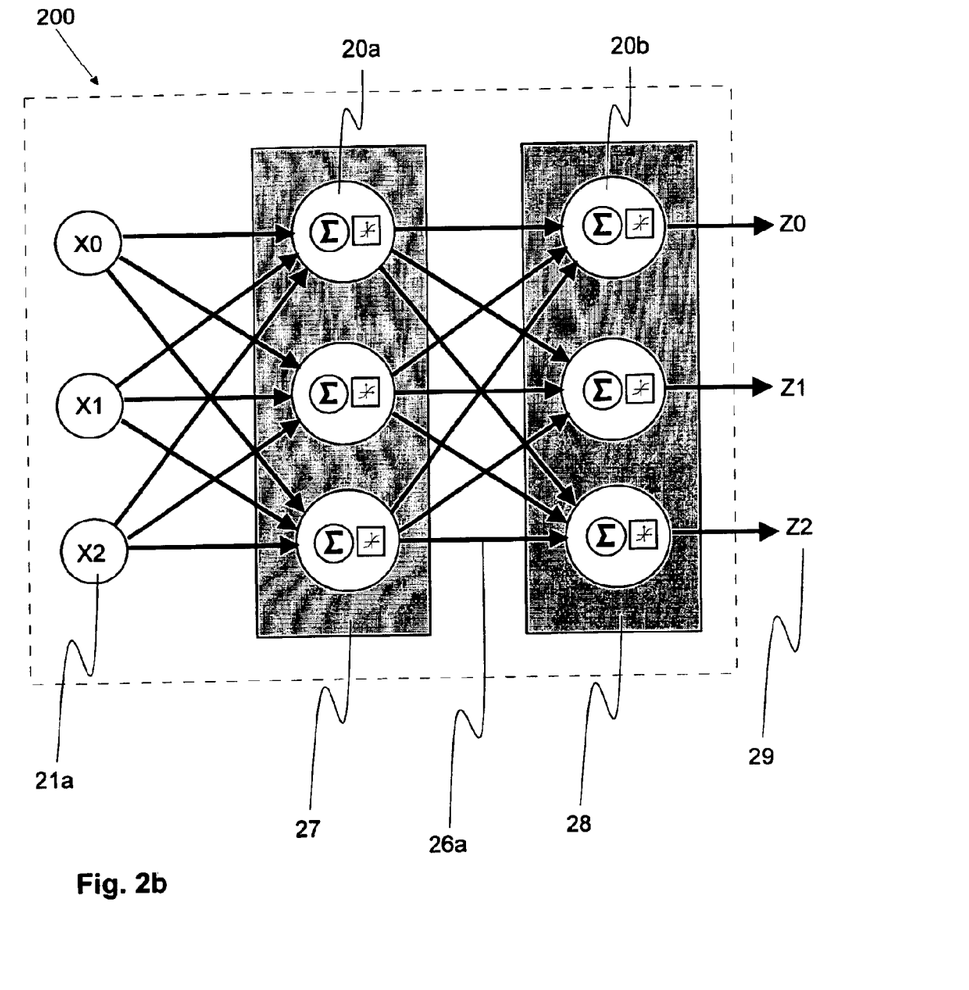
FIG. 2b shows by way of example a neural network comprising a plurality of cells.

FIG. 2b shows by way of example one possible way of building a neural network. The neural network 200 depicted in FIG. 2b is a so-called multiplayer-perception (MLP) network. When training such a neural network by using e.g. back-propagation, one must know both the data coming to the neural network and the desired outcome of the inference of the neural network. On the basis of these, the MLP network can be trained to realize the desired operating model/inference routine.

The exemplary neural network in FIG. 2b comprises the network input signals X0, X1 and X3, reference numeral 21a, the so-called hidden layer 27, and the neural network output cells 28. In the example depicted in FIG. 2b the hidden layer 27 and the output cells 28 both comprise three neural network neurons 20a, 20b. For simplicity, FIG. 2b does not show the weighting coefficients used in the weighting of the connections/signals 21a, 26a between the input signals and the different neurons in the neural network. The goal in the example depicted in FIG. 2b may be to train the neural network to produce result signal Z0 if the input signal is X0, result signal Z1 if the input signal is X1, and result signal Z2 if the input signal is X2. Naturally, all other signal combinations alone and in combination with each other are possible, too. In addition to the hidden layer shown in FIG. 2b the neural network may have other hidden layers connected one after the other or in parallel. The actual practical construction of the neural network depends on the intended use thereof.

Figure 3:
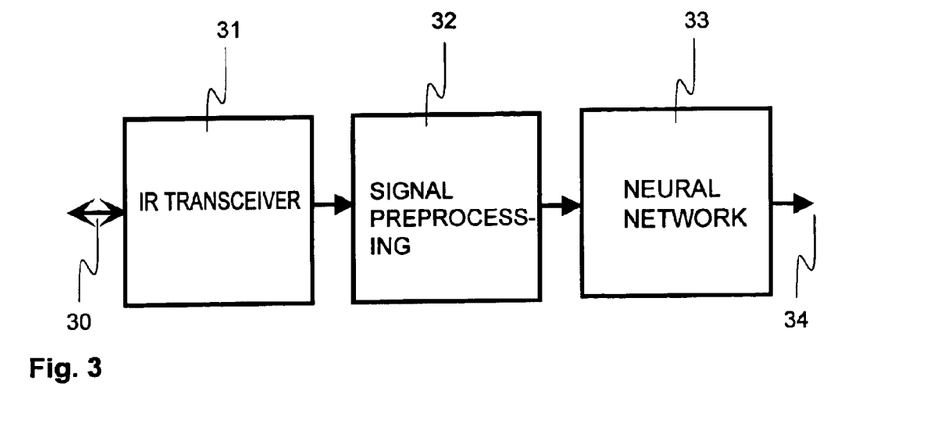
FIG. 3 shows by way of example the main components of an apparatus according to the invention.

FIG. 3 shows by way of example the main functional components of a virtual keyboard based on neural network technology according to the invention. An infrared transceiver 31, hereinafter IR transceiver, emits and receives infrared radiation 30. The received signal is preprocessed in block 32. In the example of FIG. 3, there are as many IR transceivers 31 and signal preprocessing blocks 32 as there are transceivers 12a–12f in the example of FIG. 1. Naturally, the quantity of transceivers 12 is not limited to the six shown in FIG. 1. From block 32 the preprocessed signals are fed into the neural network element 33 which outputs signal 34 which advantageously corresponds to the pressing of a key on the virtual keyboard or a desired function of the terminal.

Figure 4:
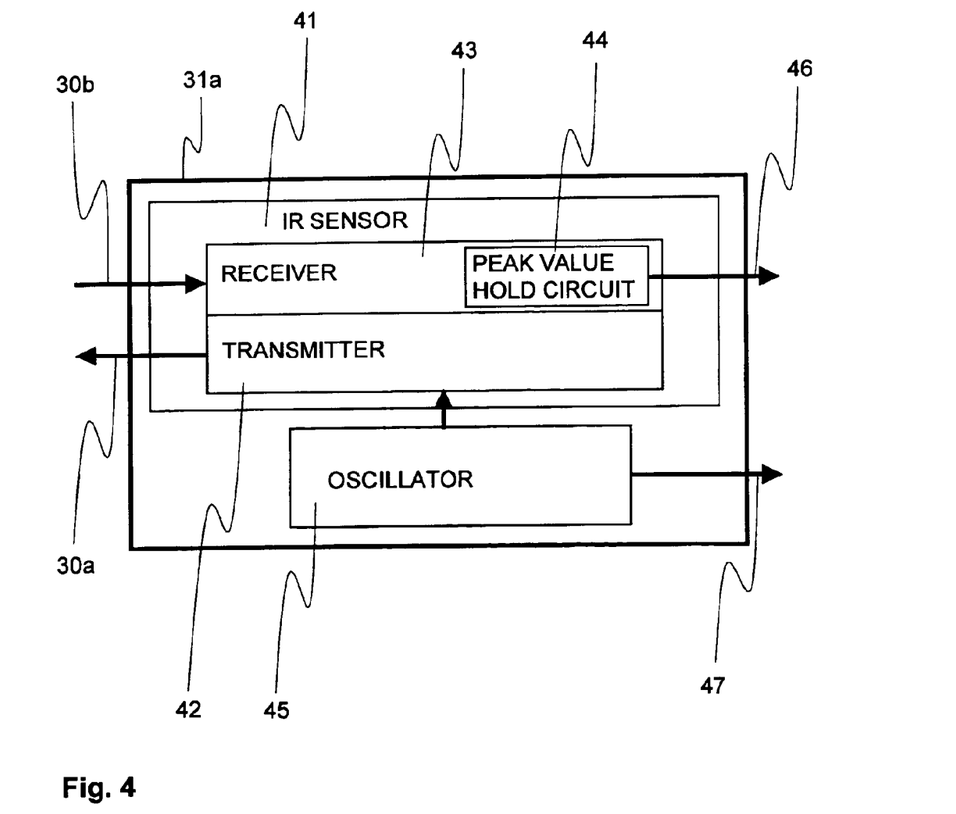
FIG. 4 shows by way of example the main components of an infrared transmitter-receiver arrangement.

FIG. 4 shows by way of example the main components of the IR transceiver 31a shown in FIG. 3. The transceiver comprises an IR sensor part 41 which in turn comprises an IR transmitter 42 to emit an IR beam 30a. It further comprises an IR receiver 41 to receive an incoming IR beam. The receiver 41 further comprises a received signal peak value hold circuit 44 which for a desired time keeps in its memory the received signal peak value which varies advantageously from 0 to 3.5 volts. The analog signal peak value 46 is further conducted to signal pre-processing. Timing for the transmitter and receiver is provided by an oscillator 45 which gives the clock signal 47 needed by the arrangement and which is also used in other timing of the operation of the input arrangement.

Figure 5:
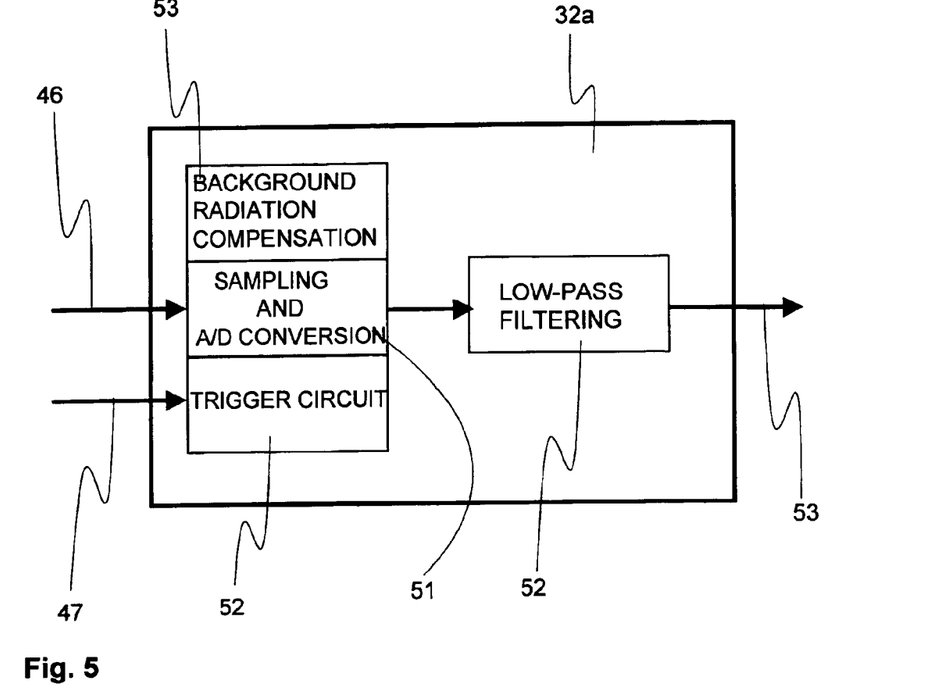
FIG. 5 shows by way of example the main components in signal preprocessing.

FIG. 5 shows by way of example the main components of the signal preprocessing part 32a in the arrangement according to FIG. 3. The received signal peak value 46 and clock signal 47 are provided by the IR transceiver 31a. This peak value 46 includes various unwanted components in addition to the actual payload signal. One of these is background radiation for which the preprocessing part 32a comprises a background radiation compensation circuit 54. The clock signal 47 is conducted to a trigger circuit 50. The trigger circuit controls signal sampling and the operation of an AD converter circuit 51 following the sampling. The AD converter produces a train of digital samples of the received signal, which is conducted to a digital low-pass filter 52. The upper frequency limit of the low-pass filter is advantageously 5 to 20 Hz. The digital filter may be realized using either IIR (Indefinite Impulse Response) or FIR (Finite Impulse Response) technology. The low-pass filtered signal 53 is conducted to the neural network for the inference process. There are advantageously as many signals 53 as there are actual IR transceiver units in the apparatus according to the invention.

Figure 6:
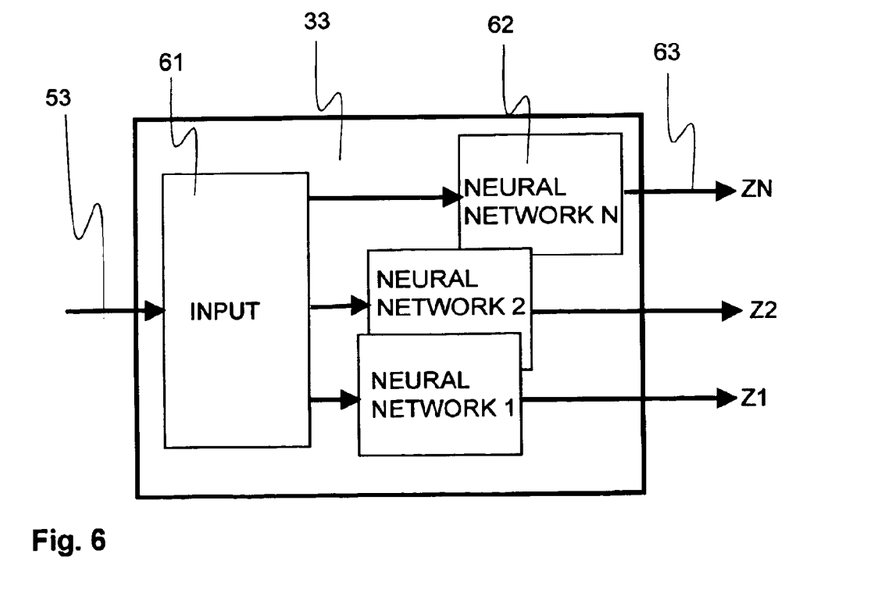
FIG. 6 shows by way of example the main components of a neural network in the arrangement according to the invention.

FIG. 6 shows by way of example an advantageous embodiment to realize the neural network element 33 shown in FIG. 3. The neural network element 33 comprises a signal input part 61 into which all input signals 53 processed by the signal preprocessing part 32 are fed. There are advantageously as many of these input signals as there are IR transceivers in the apparatus according to the invention. The neural network element 33 proper comprises N discrete neural networks 62. N is advantageously greater than the number of IR transceivers in the apparatus. Advantageously N is at least equal to the number of separate keys/functions in the desired virtual keyboard. From the input signals 30b the neural network element 33 infers, in accordance with the inference rules it has learned, that a certain key Zm of the virtual keyboard was pressed. In this example, m is in the range 1 to N. An inference system based on neural network technology according to this example requires 10 to 50 kB of memory, so it can be implemented in a cellular phone's memory.

Figure 7:
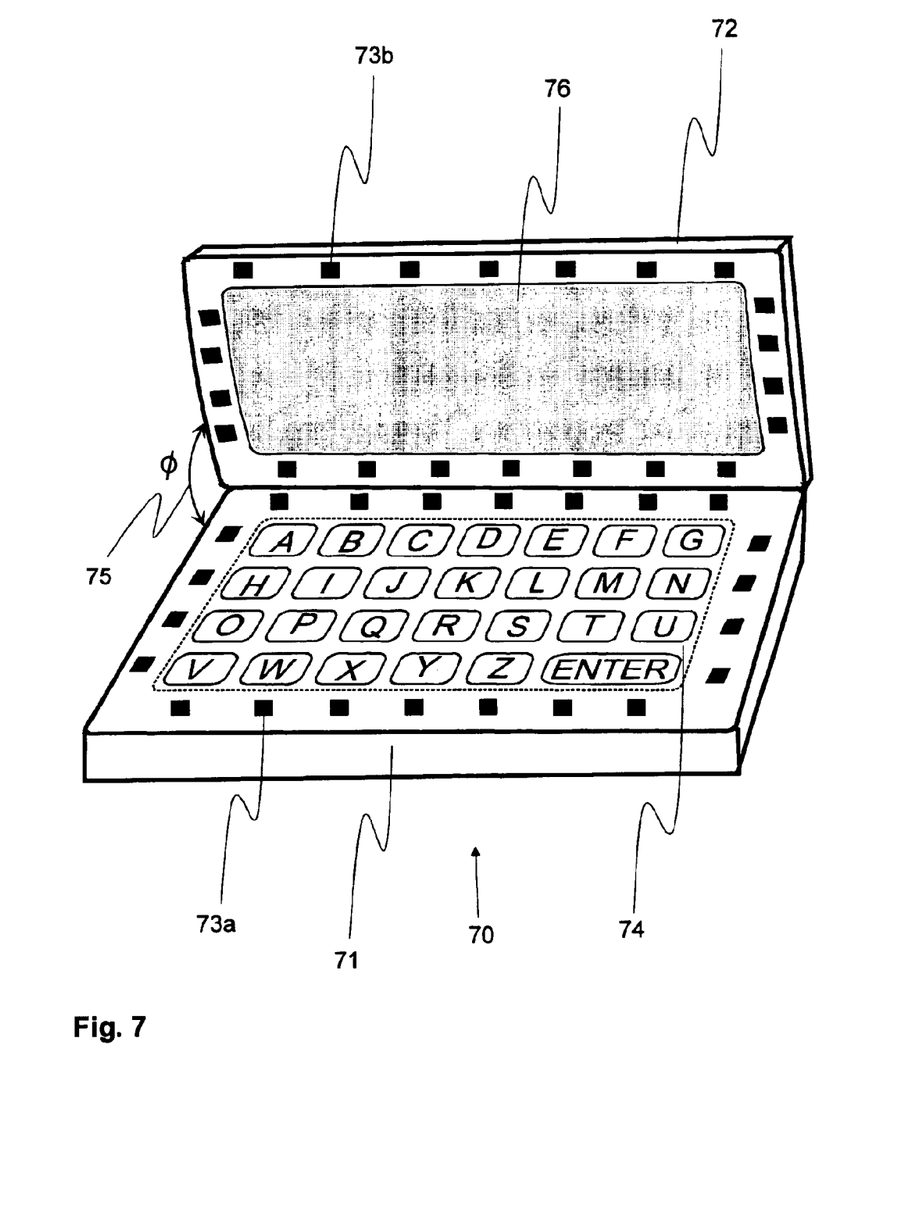
FIG. 7 shows by way of example a three-dimensional virtual keyboard according to the invention.

FIG. 7 shows by way of example an embodiment according to the invention which enables 3D positioning of an object in addition to the 2D positioning described above. The exemplary situation of FIG. 7 involves a so-called laptop computer 70. The latter comprises the body 71 of the apparatus, on a surface of which there is the keyboard part 74 proper. The cover part 72 of the apparatus includes the display 76 proper. In accordance with the invention, IR transceivers 73a, 73b are attached to both the body part 71 and the cover part 72. Now, in the exemplary situation of FIG. 7, these IR transceivers 73a, 73b form a 3-dimensional network above the keyboard 74 proper. Signals from this 3-dimensional network are processed by two neural networks according to the invention for the processing of a 2-dimensional signal. When an artificial obstacle, say a finger, pen or pointer, is placed above the keyboard 74, the IR receivers of both the body part 71 and the cover part 72 recognize its position. When the angle $\Phi 75$ between the body part 71 and cover part 72 is known, the position/shape of the obstacle can be computed 3-dimensionally from these two 2-dimensional measurements. An arrangement according to this embodiment may be advantageously utilized in the 3D manipulation of an object on the display 76 proper. Thus the 3-dimensional pattern recognition arrangement according to the invention may be used instead of various commands issued by means of a keyboard or PC mouse.

The virtual keyboard arrangement according to the invention may also be generated using a separate auxiliary, both in 2-dimensional and 3-dimensional embodiments. Such an auxiliary is connected with the terminal proper via either a wired or wireless link.

Above it was mainly described how the virtual keyboard according to the invention functions as a substitute for a physical keyboard. However, a pattern recognition system according to the invention which is realized by a neural network has enough capacity to determine the position of a moving artificial obstacle, too. Therefore, the method according to the invention can be advantageously applied instead of a so-called mouse or various scrolling keys for controlling a display or issuing commands in 2D systems. When the invention is applied in a 3D device, the movement or stopping of the movement of an artificial obstacle may be used to realize versatile functions. In particular, in 3D imaging the invention may be advantageously used to rotate an object on the screen, change its shape or color it, for example. Furthermore, it is possible to use the artificial obstacle as a three-dimensional means of drawing a 3-dimensional object. The arrangement according to the invention can also simultaneously recognize several artificial obstacles in the virtual keyboard and follow their movements.

Figure 8:
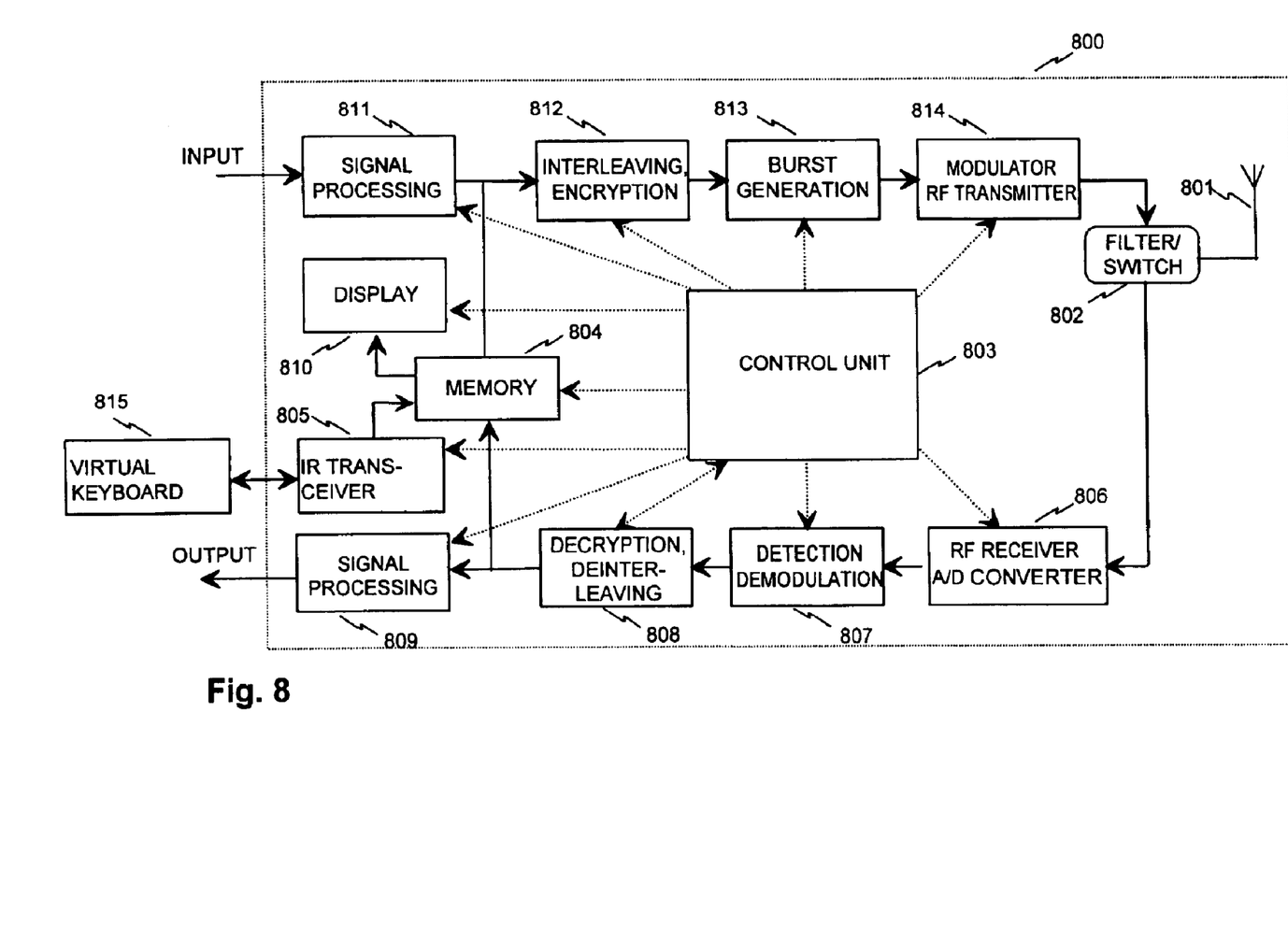
FIG. 8 shows a cellular terminal according to the invention and its connection with a cellular radio system.

FIG. 8 shows a simplified block diagram of a cellular terminal 800 in which the virtual keyboard according to the invention can be applied. The terminal comprises an antenna 801 for receiving radio-frequency (RF) signals transmitted by base stations. A received RF signal is directed by a switch 802 to a RF receiver 806 where the signal is amplified and converted digital. The signal is then detected and demodulated in block 807. Block 808 performs decryption and deinterleaving. Then follows signal processing in block 809. Received data may be stored as such in the mobile station's memory 804 or, alternatively, the processed packet data are taken after the signal processing to a possibly external device such as a computer. A control unit 803 controls the above-mentioned reception blocks in accordance with a program stored in the unit.

Transmission from the mobile station is performed e.g. as follows. Controlled by the control block 803, block 811 performs possible signal processing on the data and block 812 performs interleaving and encryption on the processed signal to be transmitted. Bursts are generated from the encoded data, block 813, which are modulated and amplified into a RF signal to be transmitted, block 814. The RF signal to be transmitted is conducted to the antenna 801 by means of the switch 802. These processing and transmission functions, too, are controlled by the control unit 803.

In the terminal of FIG. 8, the components that are essential from the invention's perspective include the prior-art control block 803 and the terminal's memory 804. In addition, the terminal should have an IR transceiver unit 805 according to the invention for producing a virtual keyboard 815. The control unit 803 controls the operation and use of the virtual keyboard according to the invention. Part of the memory 804 of the terminal has to be allocated for the generation of a neural network required by the operation of the virtual keyboard according to the invention. Naturally, a detachable memory medium associated with the terminal, such as a SIM card, which is known as such, may also be used for this same purpose.

Above it was described some advantageous embodiments according to the invention. The invention is not limited to the solutions described here. The inventional idea may be applied in many ways within the scope defined by the claims attached hereto.

What is claimed is:

1. A method for entering data in an electronic apparatus housed within a body, which method comprises the steps of
   emitting infrared radiation from two or more infrared transmitters in at least one plane,
   placing an obstacle in the radiation field of the infrared transmitters,
   receiving infrared radiation reflected from the obstacle by at least one infrared receiver in at least one plane,
   preprocessing the received reflected signal, and
   determining the position of the obstacle on the basis of the received preprocessed signal,
   wherein for determination of the position of the obstacle in at least one plane, a neural network arrangement is used into which the preprocessed signal is conducted to determine the position.

2. A method according to claim 1 wherein the neural network arrangement is a multiplayer-perception (MLP) network.

3. A method according to claim 1 wherein in signal preprocessing, an analog sample is taken from the received signal, the analog sample taken is converted digital in an AD converter, a train of samples is formed of successive digital samples and the said digital train of samples is low-pass filtered by a digital filter.

4. A method according to claim 1 wherein infrared radiation is received by two infrared receiver arrangements at a known angle with respect to each other in order to determine the position of a three-dimensional obstacle.

5. A method according to claim 1 wherein infrared radiation is received by two infrared receiver arrangements at a known angle with respect to each other in order to recognize the movement of a three-dimensional obstacle.

6. An input arrangement for entering data in an electronic apparatus housed within a main body, which arrangement comprises a means for creating and using a virtual keyboard containing at least one row of virtual keys generated in an input area outside the main body of the apparatus, including two or more infrared transmitters in at least one plane to generate infrared radiation that is reflected by an obstacle in a radiation field to at least one infrared receiver to determine a position of the obstacle wherein the means further comprises a pattern-recognizing neural network element stored in the memory of the apparatus to recognize the use of a given key in the virtual keyboard.

7. An input arrangement according to claim 6 wherein the input arrangement comprises two input arrangements at a known angle with respect to each other in order to create a three-dimensional virtual user interface.

8. An input arrangement according to claim 6 wherein the said electronic apparatus is a cellular phone.

9. An input arrangement according to claim 6 wherein the means for creating a virtual keyboard comprises an IR transceiver arrangement, which comprises an infrared transmitter for emitting infrared radiation to the data input area and an infrared receiver for measuring the infrared radiation reflected from an obstacle.

10. An input arrangement according to claim 9 wherein the infrared receiver includes a peak value hold circuit.

11. An input arrangement according to claim 9 wherein the IR transceiver arrangement includes an oscillator to generate the clock frequency required by the input arrangement.

12. A neural network element of an input arrangement according to claim 6 wherein the said neural network element comprises a signal input part and at least one neural network.

13. A neural network in an input arrangement according to claim 12 wherein the neural network is a MLP network.

14. An input arrangement according to claim 13 wherein the MLP network comprises at least one input signal feed line for inputting data to at least one of the neurons of a hidden layer, at least one hidden layer, at least one connection from the neurons of the hidden layer to the output cells of the neural network, and at least one output cell of the neural network to indicate the decision made by the neural network.

15. An input arrangement according to claim 6 wherein the arrangement further comprises a signal preprocessing part to convert an analog signal into a digital signal.

16. An input arrangement according to claim 15 wherein the signal preprocessing part includes a background radiation compensation circuit, sampling circuit and AD converter and a low-pass filter.

17. An input arrangement according to claim 16 wherein the upper frequency limit of the low-pass filter is of the order of 5 to 20 Hz.

18. An input arrangement according to claim 16 wherein the low-pass filter is an IIR filter.

19. An input arrangement according to claim 16 wherein the low-pass filter is a FIR filter.

20. A program in a neural network element belonging to a virtual keyboard for recognizing the position of an obstacle placed in the virtual keyboard, the program comprising:
   a step of receiving input signals in all neurons of a hidden layer,
   a step of weighting input signals by suitable weighting coefficients in each hidden-layer neuron,
   a step of adding up the weighted input signals in each hidden-layer neuron in order to produce an output signal,
   a step of processing the output signal in the activation element of each hidden-layer neuron in order to produce a result signal,
   a step of processing the result signals of the hidden-layer neurons in the output cells, and
   a step of implementing the results of the inference routines of the neural network element.

21. A neural network program according to claim 20 wherein the program is stored in the memory of an electronic apparatus to realize a virtual keyboard.

22. A neural network program according to claim 21 wherein the electronic apparatus is a cellular terminal.

23. A cellular terminal comprising
   means for receiving signals,
   means for transmitting signals including two or more infrared transmitters,
   a means for controlling the operation of the terminal,
   a memory for storing programs,
   an IR transceiver for creating a virtual keyboard, and
   which cellular terminal further comprises a neural network program stored in the memory of the terminal to implement the inference routines for the operation of the virtual keyboard.

24. A terminal according to claim 23 wherein it is a cellular phone.

* * * * *